Patented Aug. 10, 1937

2,089,217

UNITED STATES PATENT OFFICE 2,089,217

COMESTIBLE AND PROCESS FOR PREPARING SAME

James Cyril Mahoney, Manila, P. I.

No Drawing. Application December 29, 1934,
Serial No. 759,799

7 Claims. (Cl. 99—134)

The invention relates to food products and to a process for their preparation. More particularly it relates to comestibles which contain as an ingredient a carbohydrate of a gummy character, and includes correlated improvements and discoveries whereby the desirable qualities of comestible substances are enhanced.

It has been a practice heretofore in the preparation of a variety of comestible substances or food products which are based upon the utilization of a sugar, as cane sugar, to include therewith a smaller or larger quantity of corn syrup or glucose. Such additions have been made for the purpose of thereby lowering the cost of the product and tending to modify the characteristics, particularly the tendency to crystallization.

Considerable controversy has attended the use of glucose and it is only within recent years that a crystallized dextrose has become available and has been utilized in the preparation of foodstuffs without objections arising thereto like unto those presented pertaining to the inclusion of glucose. The addition of these auxiliary materials is attended by certain disadvantages, such as hardening of a candy when employed in its manufacture due to lack of ability to retain moisture, modification of sweetness, and of the inherent characteristics due to the presence of sucrose or cane sugar.

An object of the invention is to provide comestible substances in which disadvantages present in previous products are obviated.

A further object of the invention is to provide a comestible of improved keeping qualities and moisture retentivity.

An additional object of the invention is to provide a comestible which comprises cane sugar in which crystallization is prevented by the presence of a carbohydrate of a gummy character which is a product derivable from sucrose.

A still further object of the invention is to provide a comestible of improved qualities containing dextran which may be readily, effectively and economically produced commercially.

A more specific object of the invention is to provide candies, jellies, preserves, canned fruits and the like containing dextran as an ingredient.

A particular object of the invention is to provide a process for the preparation of comestibles which includes the incorporation of dextran.

Other objects of the invention will in part be obvious and will in part appear hereinafter.

The invention accordingly comprises the several steps and the relation and order of one or more or such steps with respect to each of the others, and the product possessing the features, properties, and the relation of constituents, which are exemplified in the following detailed disclosure, and the scope of the invention will be indicated in the claims.

In the practice of the invention a food product or comestible may be prepared in accordance with the usual procedures, including a sugar if desired, and characterized by the incorporation therewith, either during or subsequent to preparation, of a suitable quantity of the carbohydrate dextran which is of a gummy character. The comestibles with which satisfactory results have been obtained through the incorporation of dextran therewith include candies, syrups, preserves, jelly desserts, canned fruits, and the like. In fact, the dextran is a desirable constituent for use in the production of all foodstuffs in which there is a sugar content. The dextran may be prepared by known methods from the sugars, juices, syrups or molasses, derived from the beet, cane, or other sugar producing plants or saccharine substances etc., and the incorporation thereof with the other ingredients of the comestible may be either in dry form or in solution, or as a paste. It is a complex gum having a composition corresponding to the empirical formula $(C_6H_{10}O_5)_n$ formed by the action of micro-organisms, for example, leuconostoc mesenteroides, bacteriumpedicalatum etc. on saccharine matter.

The form or condition of the dextran at the time of its incorporation will depend upon the comestible substance to which it is to be added and the time during the preparation of such comestible that it is deemed suitable to make the addition. Thus, in the production of a candy or a fondant the dextran may be admixed with the sugar content prior to its solution, which is followed by evaporation and setting into the fondant condition. The quantity of dextran employed will depend upon the particular characteristics desired in the finished product, especially as to the extent to which the crystallization is to be modified. It has been found that satisfactory results in a general way may be attained through the use of 1 to 40% based upon the solid content of the comestible.

As illustrative examples of a manner in which the invention may be practiced, the following descriptions are presented. A cane sugar syrup may be prepared by dissolving 60 parts of cane sugar in 40 parts of water. In order to facilitate the solution the water may be heated. The solution thus obtained is now subjected to concentration, preferably under vacuum by indirect heat. To the solution as initially prepared, or during a desired stage of the concentration there may be added 20 parts of dextran syrup. The dextran dissolves readily in the sugar solution and by continuing the concentration to about 87° Brix there is obtained a syrup having the sweetness and other characteristics of a cane sugar syrup, but improved in that crystallization does not take place even after very extended periods of time.

The preparation of candies which consist essentially of a sugar, as cane sugar, and which contain dextran as an ingredient in a minor proportion may be accomplished by preparing the sugar material, as cane sugar, crystallized dextrose and suitable admixtures thereof, in the usual manner and condition as, for example, dissolving the sugar in water, concentrating to the desired water content and allowing crystallization to take place with constant agitation so as to form a smooth mass during the preparation of which there is incorporated a minor proportion of dextran. The dextran may be introduced during the preparation of the initial sugar solution, or during the final stage, when the formation of a smooth fondant body is taking place.

When preserving fruits through the usual procedure of canning, the fruit may be cooked in the usual manner for a short period of time in a sugar solution or syrup, with which there has been incorporated a small amount, for example 5 to 10 parts of dextran. The cooking is then continued until preservation is insured whereupon the fruit is placed in suitable containers and is ready for marketing. The presence of dextran in the fruit prevents crystallization of sugar without modification of the inherent qualities of the fruit.

In accordance with the foregoing procedures there are prepared comestible substances which are characterized by having a content of a pure sugar product inasmuch as the dextran which is added thereto is prepared directly from cane sugar without the use of chemical agents. The products obtained, in addition to absence of the formation of crystal sugars, possess also the qualities of retaining moistness thereby preventing drying out and hardening, and the body of the comestible is improved without any detraction from the usual sweetness, flavor and appearance. It will be realized, more particularly when candies are prepared, that the dextran may be an ingredient of the whole candy, or it may be present only in the covering or only in the filling. The preferred procedure is to incorporate the dextran in the filling material which then may be surrounded by any of the usual and desired coatings, for example, a chocolate coating.

The marketing of the dextran may be effected satisfactorily in the form of syrups having a varying dextran content determined by the particular trade in which the dextran is to be used. Thus, one syrup would be prepared suitable for table use, cooking, and certain classes of candy making, whereas another which would be substantially colorless and flavorless would be especially suitable for soft drink manufacturers, especially those in remote localities, and also for fruit flavor, extract production, and by canning companies, while still another syrup characterized by having a rather high dextran content would be particularly desirable for shipment into sections in which cane sugar is relatively inexpensive.

As indicated above, not only does the incorporation of dextran enhance the desirable qualities of candies, but also of jellies, desserts of a jelly character, preserves, canned fruits, cane sugar syrups, chewing gum and the like. The utilization of dextran in the various comestible substances gives a product which is of a pure sugar type and obviates the necessity for the use of glucose or corn syrup. It will be understood that the invention is not limited to the particular comestibles set forth in the foregoing examples, nor to the definite proportions set forth therein, inasmuch as not only a single comestible but an admixture of comestible substances may be prepared in which the dextran content may be varied according to the extent to which it is desired to change the character or type of the product. The quantity of dextran employed is dependent upon the qualities to be imparted. Especially it may be present in an amount from 5% to 20%, and more specifically and preferably from 5% to 10%.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process which comprises preparing a comestible having a solid content consisting preponderatingly of sugar and incorporating dextran therewith during its preparation, said dextran being present in an amount sufficient to increase the moisture retentivity of the comestible, to improve the body thereof with maintenance of sweetness, flavor and appearance, and to inhibit crystallization of the sugar.

2. A process which comprises preparing a cane sugar syrup in which the solid content consists preponderatingly of sugar and incorporating dextran therewith in an amount of from 5 to 10% of the sugar content whereby the moisture retentivity of the comestible is increased, the body thereof improved with maintenance of sweetness, flavor and appearance, and crystallization of the sugar inhibited.

3. A process which comprises preparing a candy containing a preponderating amount of sugar and incorporating dextran therein during its preparation, said dextran being present in an amount sufficient to increase the moisture retentivity of the comestible, to improve the body thereof with maintenance of sweetness, flavor and appearance, and to inhibit crystallization of the sugar.

4. As a composition of matter a comestible in which the solid content consists preponderatingly of sugar and containing dextran in an amount sufficient to increase the moisture retentivity of the comestible, to improve the body thereof with maintenance of sweetness, flavor and appearance, and to inhibit crystallization of the sugar.

5. As a composition of matter a syrup of which the solid content consists preponderatingly of sugar and containing dextran as an ingredient in an amount of from 5 to 20% based on the sugar content whereby the moisture retentivity of the syrup is increased, the body thereof improved with maintenance of sweetness, flavor and appearance, and crystallization of the sugar inhibited.

6. As a composition of matter a candy containing cane sugar as the major ingredient and dextran in an amount sufficient to increase the moisture retentivity of the comestible, to improve the body thereof with maintenance of sweetness, flavor and appearance, and to inhibit crystallization of the sugar.

7. As a composition of matter a chewing gum containing cane sugar as the preponderating sugar and dextran in an amount sufficient to increase the moisture retentivity of the composition, to improve the body thereof with maintenance of sweetness, flavor and appearance, and to inhibit crystallization of the sugar.

JAMES CYRIL MAHONEY.